United States Patent
Alagappan et al.

(10) Patent No.: US 11,782,764 B2
(45) Date of Patent: Oct. 10, 2023

(54) DIFFERENTIATED WORKLOAD TELEMETRY

(71) Applicant: International Business Machines Corporation, Armonk, NY (US)

(72) Inventors: Manickam Alagappan, Frisco, TX (US); Marci Ramona Wojcik, Grand Blanc, MI (US)

(73) Assignee: International Business Machines Corporation, Armonk, NY (US)

( * ) Notice: Subject to any disclaimer, the term of this patent is extended or adjusted under 35 U.S.C. 154(b) by 245 days.

(21) Appl. No.: 17/368,926

(22) Filed: Jul. 7, 2021

(65) Prior Publication Data

US 2023/0009332 A1 Jan. 12, 2023

(51) Int. Cl.
*G06F 9/50* (2006.01)
*G06F 11/30* (2006.01)
*G06F 11/34* (2006.01)
*G06F 3/06* (2006.01)

(52) U.S. Cl.
CPC ............ *G06F 9/505* (2013.01); *G06F 3/061* (2013.01); *G06F 3/067* (2013.01); *G06F 3/0631* (2013.01); *G06F 3/0653* (2013.01); *G06F 9/5016* (2013.01); *G06F 9/5022* (2013.01); *G06F 9/5072* (2013.01); *G06F 9/5077* (2013.01); *G06F 11/3034* (2013.01); *G06F 11/3433* (2013.01); *G06F 2201/86* (2013.01);
(Continued)

(58) Field of Classification Search
CPC ........ G06F 9/505; G06F 3/061; G06F 3/0631; G06F 9/5072; G06F 9/5077; G06F 11/3034; G06F 11/3433; G06F 2201/86
See application file for complete search history.

(56) References Cited

U.S. PATENT DOCUMENTS

| | | | |
|---|---|---|---|
| 6,260,062 B1 * | 7/2001 | Davis | H04L 41/5003 709/223 |
| 9,356,883 B1 * | 5/2016 | Borthakur | H04L 41/5025 |
| 9,740,876 B1 | 8/2017 | Nachenberg | |

(Continued)

OTHER PUBLICATIONS

Bankole, Akindele Abisola, "Cloud Client Prediction Models for Cloud Resource Provisioning in a Multitier Web Application Environment", A thesis submitted for the degree of Master of Applied Science in Electrical and Computer Engineering, Ottawa-Carleton Institute for Electrical and Computer Engineering, Apr. 2013, 85 pages, <https://curve.carleton.ca/system/files/etd/9277dcad-7712-48e9-b2b5-1ddea232e4c9/etd_pdf/0bae09c781a7512309f6e06608081fae/bankole-cloudclientpredictionmodelsforcloudresource.pdf>.

(Continued)

*Primary Examiner* — Benjamin C Wu
(74) *Attorney, Agent, or Firm* — Douglas M. Crockatt (57) ABSTRACT

In an approach for generating differentiated workload telemetry data, a processor corresponds one or more services with a workload related telemetry generating an event emitter. A processor performs a correlation analysis of corresponding relationship and connection among connected resources and current traffic into and out of the one or more services. A processor labels domain context for each telemetry event. A processor communicates each telemetry event to a global event handler. A processor performs a cross-correlation in real-time of telemetry data with the global event handler. A processor updates a real-time differentiated workload report.

17 Claims, 6 Drawing Sheets

(52) U.S. Cl.
CPC .............. *G06F 2206/1012* (2013.01); *G06F 2209/508* (2013.01); *G06F 2209/5022* (2013.01)

(56) References Cited

U.S. PATENT DOCUMENTS

| | | | |
|---|---|---|---|
| 9,893,952 | B2 | 2/2018 | Wu |
| 10,182,129 | B1* | 1/2019 | Peterson .................... G06F 8/65 |
| 10,671,621 | B2 | 6/2020 | Ungar |
| 10,728,119 | B2 | 7/2020 | Parandehgheibi |
| 10,785,105 | B1 | 9/2020 | Rathinasabapathy |
| 10,796,322 | B1* | 10/2020 | Ramalingam ......... H04L 47/823 |
| 10,838,756 | B2 | 11/2020 | Singh et al. |
| 10,924,374 | B2 | 2/2021 | Kfir |
| 10,924,410 | B1* | 2/2021 | Nee ........................ H04L 67/566 |
| 11,533,232 | B2* | 12/2022 | Hu ........................ H04L 41/0893 |
| 2004/0103193 | A1 | 5/2004 | Pandya |
| 2007/0288419 | A1* | 12/2007 | Strassner .................. G06N 5/02 706/55 |
| 2011/0275364 | A1* | 11/2011 | Austin ..................... H04L 41/06 455/423 |
| 2015/0288557 | A1* | 10/2015 | Gates .................. G06F 11/0709 714/37 |
| 2016/0359680 | A1 | 12/2016 | Parandehgheibi et al. |
| 2018/0365264 | A1 | 12/2018 | Chung |
| 2019/0238437 | A1 | 8/2019 | Maltz |

OTHER PUBLICATIONS

Mell et al., "The NIST Definition of Cloud Computing", National Institute of Standards and Technology, Special Publication 800-145, Sep. 2011, 7 pages.

* cited by examiner

DIFFERENTIATED WORKLOAD TELEMETRY

BACKGROUND

The present disclosure relates generally to the field of workload telemetry, and more particularly to generating differentiated workload telemetry data for creation of a licensing model that meters all utilized enterprise resources in a hybrid and multi-cloud environment.

Telemetry may be an automatic recording and transmission of data from remote or inaccessible sources to a system in a different location for monitoring and analysis. Cloud telemetry may use software tool to record and analyze information about infrastructure that would otherwise be difficult to gather. By making effective use of telemetry, organizations can improve key performance indicators, including reliability, security, performance, and power consumption. Telemetry can also generate insights to help manage evolving capacity requirements and detect whether infrastructure is being used efficiently. Telemetry capabilities have become more robust in recent years. Newer metrics and techniques, made available with advanced hardware, allow deeper cloud monitoring and analysis than previous generations of technology. In the software development world, telemetry can offer insights on which features end users use most, detection of bugs and issues, and offering better visibility into performance without the need to solicit feedback directly from users.

SUMMARY

Aspects of an embodiment of the present disclosure disclose an approach for generating differentiated workload telemetry data. A processor corresponds one or more services with a workload related telemetry generating an event emitter. A processor performs a correlation analysis of corresponding relationship and connection among connected resources and current traffic into and out of the one or more services. A processor labels domain context for each telemetry event. A processor communicates each telemetry event to a global event handler. A processor performs a cross-correlation in real-time of telemetry data with the global event handler. A processor updates a real-time differentiated workload report.

DETAILED DESCRIPTION

The present disclosure is directed to systems and methods for generating differentiated workload telemetry data for creation of a licensing model that meters all utilized enterprise resources in a hybrid and multi-cloud environment.

Embodiments of the present disclosure recognize a need for collecting logs and execution metrics related to applications and infrastructures in a differentiated workload on disparate systems in a hybrid and multi-cloud environment. Telemetry data may be curated using a combination of loggregators and elastic search tools to organize and group the collected data and to analyze the data using a variety of tools and techniques. Classification of telemetry data may occur as part of a labeling system as the logs are generated from disparate services loosely correlated to the application domain. Embodiments of the present disclosure recognize a need for providing useful workload estimation information for the purpose of establishing licensing fees based on enterprise scale resources that are used in the fulfillment of application domain business functions. Embodiments of the present disclosure recognize a need for collecting data and performing analysis of the data in differentiated workload conditions which constantly change impacting correlated asset usage changes in real-time. Embodiments of the present disclosure disclose systems and methods of generating differentiated workload telemetry data useful for creation of a licensing model that meters all utilized enterprise resources in a hybrid and multi-cloud environment. Embodiments of the present disclosure disclose producing a continuous license able to scale up and down according to onboarded components that comprise a differentiated workload. Embodiments of the present disclosure disclose automatically gathering relevant telemetry data across an enterprise in an application domain so that realistic licensing estimates can be assigned to differentiated workloads in a hybrid and multi-cloud environment including legacy applications and related workloads. Embodiments of the present disclosure disclose automatically generating differentiated workload telemetry data in a hybrid and multi-cloud environment along with legacy application licensing information.

Embodiments of the present disclosure disclose corresponding each custom cloud service with a workload related telemetry generating event emitter, e.g., usage, complexity, timestamp, container, pod, server, host, database. Embodiments of the present disclosure disclose onboarding every dependency onto a monitoring system capable of penetration and determining a load impact metric generation. Embodiments of the present disclosure disclose performing a correlation analysis including connected resources, and current traffic into and out of the service. Embodiments of the present disclosure disclose labeling domain context for each event. Embodiments of the present disclosure disclose communicating a telemetry event to a global event handler. Embodiments of the present disclosure disclose, using a global event handler, performing a cross-correlation in real-time of telemetry data and updating a real-time differentiated workload report.

Embodiments of the present disclosure disclose a system of real-time telemetry of cloud resources running in a hybrid and multi-cloud environment. Embodiments of the present disclosure disclose a system whereby cloud containers and native services are instrumented with the capability of self-reporting telemetry events which are immediately captured and correlated to the data traffic flow into and out of the cloud service gateway. Embodiments of the present disclosure disclose capturing and reporting real-time telemetry of workloads processed by native services and containerized services in a hybrid and multi-cloud environment. Embodiments of the present disclosure disclose a hyperscale environment whereby the network traffic into and out of the service gateway may be classified immediately and correlated to the processing service(s) or container(s). Ingress may be a facility that provides a workload onboarding and initiates an accurate usage metering to create realistic and dynamic licensing terms for the workload. Real-time telemetry of onboarded workloads may provide a means of dynamically assessing current workload conditions and usage characteristics. Embodiments of the present disclosure disclose workload onboarding (ingress) and offboarding (egress) to establish a real-time metering capability that allows accurate licensing of a workload computing usage in a hybrid and multi-cloud environment. Embodiments of the present disclosure disclose creating an accurate and dynamic workload licensing model through efficient and effective computing metering in a hybrid and multi-cloud environment. Embodiments of the present disclosure disclose a telemetry gathering and analysis system designed for a hybrid and multi-cloud environment that provides a responsive and dynamic licensing model based on actual usage and available computing resources. Embodiments of the present disclosure disclose creating an event driven system and a global event handler to capture generated events for data analysis. Embodiments of the present disclosure disclose an approach to telemetry data promoting a real-time autocorrelation, analysis, and reporting capability. A global event handler may be internal to the cloud and may automatically inherit a fine-grained data security infrastructure offered by a cloud service. Embodiments of the present disclosure disclose using an ingress onboarding mechanism to profile a workload and instrumenting the workload with the means of generating telemetry events. A global event or event handler may be resident on the cloud to capture and process these events and send the events to a data analyzer service. Embodiments of the present disclosure disclose an ingress gateway which onboards a workload, instrumenting the workload with the capability to emit telemetry events in real time to be gathered and processed downstream by a global event handler service.

Figure 1:
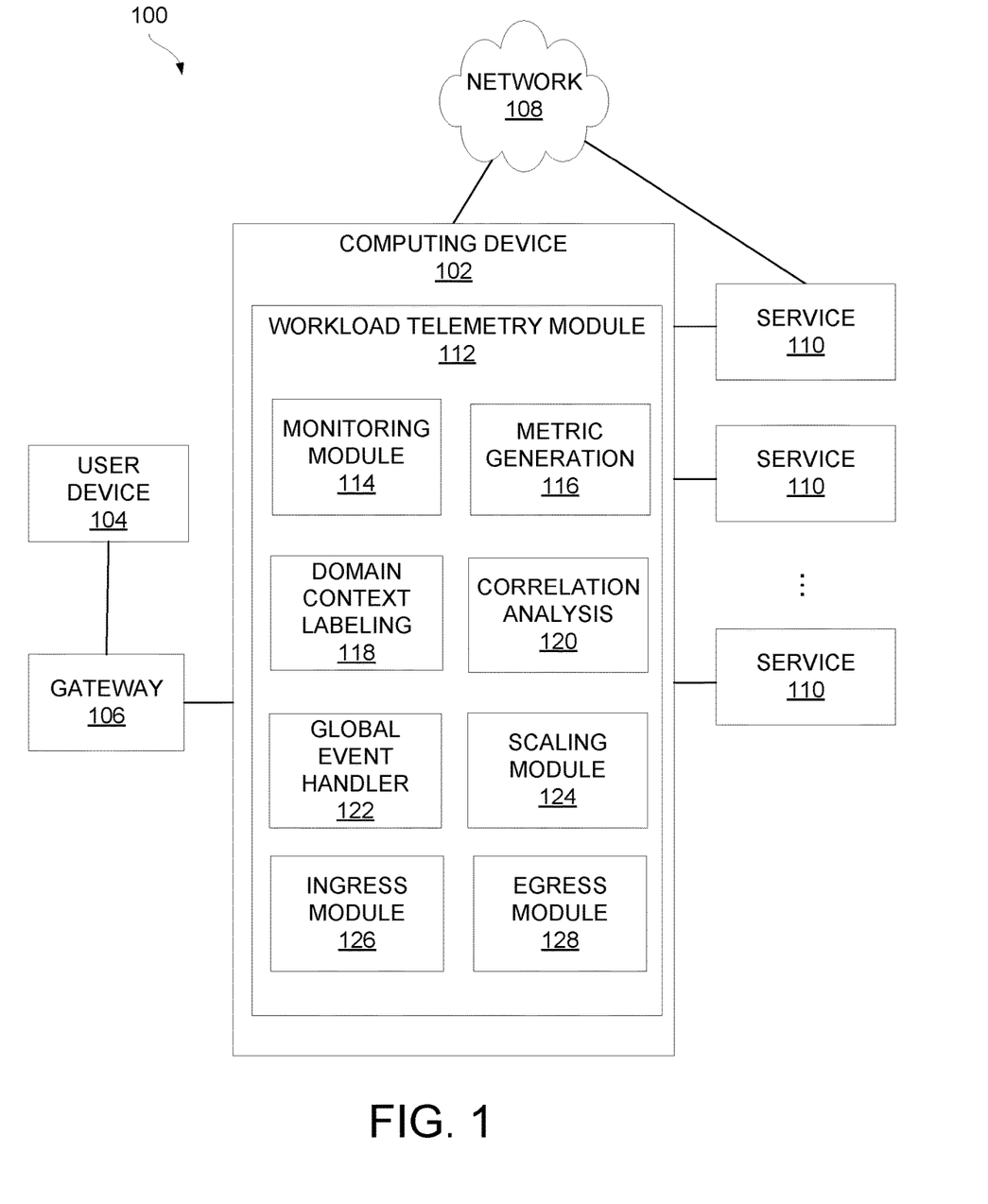
FIG. 1 is a functional block diagram illustrating a differentiated workload telemetry environment, in accordance with an embodiment of the present disclosure.

The present disclosure will now be described in detail with reference to the Figures. FIG. 1 is a functional block diagram illustrating a differentiated workload telemetry environment, generally designated 100, in accordance with an embodiment of the present disclosure.

In the depicted embodiment, differentiated workload telemetry environment 100 includes computing device 102, user device 104, gateway 106, network 108, and service(s) 110. In various embodiments of the present disclosure, user device 104 can be a constrained device to be allowed to access and use service(s) 110 in a cloud environment. For example, user device 104 can be a licensed device to access and use service(s) 110. In an example, user device 104 can be a Bluetooth low energy device, a non-TCP (transmission control protocol) device, or any other suitable user device. In various embodiments of the present disclosure, gateway 106 can be a hardware or software appliance that serves as a bridge between local applications and remote cloud-based services 110. Gateway 106 may provide basic protocol translation and simple connectivity to allow incompatible technologies to communicate. Gateway 106 may be hardware or a virtual machine image. In the depicted embodiment, gateway 106 is located outside computing device 102. However, in other embodiments, gateway 106 may be located in computing device 102. In various embodiments of the present disclosure, service(s) 110 may be various cloud services, e.g., infrastructure, platforms, or software that are hosted by third-party providers and made available to users through the internet. Cloud services 110 may facilitate the flow of user data from front-end clients, through the internet, to the provider's systems, and back. A user (e.g., user device 104) may access cloud services 110 with a computer, operating system, and internet connectivity or virtual private network.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to workload telemetry module 112 and network 108 and is capable of processing program instructions and executing workload telemetry module 112, in accordance with an embodiment of the present disclosure. Computing device 102 may include internal and external hardware components, as depicted and described in further detail with respect to FIG. 4.

Further, in the depicted embodiment, computing device 102 includes workload telemetry module 112. In the depicted embodiment, workload telemetry module 112 is located on computing device 102. However, in other embodiments, workload telemetry module 112 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and workload telemetry module 112, in accordance with a desired embodiment of the disclosure.

Further, in the depicted embodiment, workload telemetry module 112 includes monitoring module 114, metric generation 116, domain context labeling 118, correlation analysis 120, global event handler 122, scaling module 124, ingress module 126, and egress module 128. In the depicted embodiment, monitoring module 114, metric generation 116, domain context labeling 118, correlation analysis 120, global event handler 122, scaling module 124, ingress module 126, and egress module 128 are located on computing device 102 and workload telemetry module 112. However, in other embodiments, workload telemetry module 112 may be located externally and accessed through a communication network such as network 108.

In one or more embodiments, workload telemetry module 112 is configured to correspond each custom cloud service 110 with a workload related telemetry generating an event emitter (e.g., usage, complexity, timestamp, container, pod, server, host, database). Telemetry may refer to monitoring and analyzing information about cloud service(s) 110 to track performance and identify issues. Telemetry may be an automated communication process from multiple data sources. An event emitter may be a pattern that listens to a named event. An event emitter may fire a callback. An event emitter may emit an event with a value. With an event emitter, workload telemetry module 112 may raise a new event from a different part of an application. Workload telemetry module 112 may listen to the raised event. Workload telemetry module 112 may have an action performed for the event. Workload telemetry module 112 may collect logs and execution metrics related to applications and infrastructure on disparate systems. Workload telemetry module 112 may collect the logs and execution metrics in a real-time telemetry of cloud resources running in a hybrid and multi-cloud environment. Workload telemetry module 112 may provide workload onboarding and may initiate accurate usage metering to create realistic and dynamic licensing terms for the workload. Workload telemetry module 112 may dynamically assess workload conditions and usage characteristics with the real-time telemetry of onboarded workloads. For example, workload telemetry module 112 may assess workload conditions and usage characteristics, e.g., who has initiated the workload, when the workload is initiated, what the planned workload execution is, what the actual workload execution is, when the workload stops. In an example, workload telemetry module 112 may onboard a workflow, whereby the telemetry events are assigned, initiated and provided to global event handler 122. Workload telemetry module 112 may offboard the workload and may automatically provide an exit report including utilization, cleanup, security and other workload statistics. Workload telemetry module 112 may establish a real-time metering capability that allows an accurate licensing of workload computing usage in a hybrid and multi-cloud environment. Workload telemetry module 112 may provide a responsive and dynamic licensing model based on actual usage and available compute resources.

In one or more embodiments, workload telemetry module 112 is configured to onboard every dependency onto a monitoring system capable of penetration. Workload telemetry module 112 may determine a load impact metric generation. For example, workload telemetry module 112 may determine a metric that identifies a rate at which an application reads a disk. Workload telemetry module 112 may determine a metric that identifies a rate at which an application writes to a hard disk. Workload telemetry module 112 may determine a metric that is used to determine the volume of the data the application reads from the hard disk of the instance. Workload telemetry module 112 may determine a metric that is used to determine the volume of the data the application writes onto the hard disk of the instance. Workload telemetry module 112 may determine a metric that identifies the volume of incoming network traffic to an application on a single instance. Workload telemetry module 112 may determine a metric that identifies the volume of outgoing network traffic to an application on a single instance. Workload telemetry module 112 may determine a metric that collects and sends the memory utilization excluding cache memory and buffers. Workload telemetry module 112 may determine a metric that collects and sends available memory used by the operating system and the application. Workload telemetry module 112 may determine the amount of swap space utilized.

In one or more embodiments, workload telemetry module 112 is configured to perform a correlation analysis of the corresponding relationship and connection among connected resources, and current traffic into and out of service(s) 110. Workload telemetry module 112 may label domain context for each event. Workload telemetry module 112 may capture and report real-time telemetry of workloads processed by native services and containerized services in a hybrid and multi-cloud environment. The hybrid and multi-cloud environment may be a hyper-scale environment whereby the network traffic into and out of the service gateway can be classified immediately and auto correlated to the processing service(s) or container(s).

In one or more embodiments, workload telemetry module 112 is configured to communicate a telemetry event to global event handler 122. A global event or event handler may be resident on the cloud to capture and process these events and send the events to a data analyzer service. Workload telemetry module 112 may perform, using global event handler 122, a cross-correlation in real-time of telemetry data and may update a real-time differentiated workload report.

In one or more embodiments, monitoring module 114 is configured to correspond each custom cloud service 110 with a workload related telemetry generating an event emitter. Monitoring module 114 may monitor and collect the logs and execution metrics in a real-time telemetry of cloud resources running in a hybrid and multi-cloud environment. Monitoring module 114 may provide workload onboarding and may initiate accurate usage metering to create realistic and dynamic licensing terms for the workload. Monitoring module 114 may assess workload conditions and usage characteristics, e.g., who has initiated the workload, when the workload is initiated, what is the planned workload execution, what is the actual workload execution, when the workload stops. Monitoring module 114 may gather telemetry data that allows creation of accurate workload licensing based on the telemetry data. In one or more embodiments, ingress module 126 may onboard a workflow, whereby the telemetry events are assigned, initiated and provided to global event handler 122. Ingress module 126 may onboard every dependency onto a monitoring system capable of penetration. Ingress module 126 may be a facility that provides the workload onboarding and initiates accurate usage metering to create realistic and dynamic licensing terms for the workload. In one or more embodiments, egress module 126 may offboard the workload and may automatically provide an exit report including utilization, cleanup, security and other useful workload statistics.

In one or more embodiments, metric generation 116 is configured to determine a load impact metric generation. For example, metric generation 116 may determine a metric that identifies a rate at which an application reads a disk. Metric generation 116 may determine a metric that identifies a rate at which an application writes to a hard disk. Metric generation 116 may determine a metric that is used to determine the volume of the data the application reads from the hard disk of the instance. Metric generation 116 may determine a metric that is used to determine the volume of the data the application writes onto the hard disk of the instance. Metric generation 116 may determine a metric that identifies the volume of incoming network traffic to an application on a single instance. Metric generation 116 may determine a metric that identifies the volume of outgoing network traffic to an application on a single instance. Metric generation 116 may determine a metric that collects and sends the memory utilization excluding cache memory and buffers. Metric generation 116 may determine a metric that collects and sends available memory used by the operating system and the application. Metric generation 116 may determine the amount of swap space utilized.

In one or more embodiments, correlation analysis module 120 is configured to perform a correlation analysis the corresponding relationship and connection among connected resources, and current traffic into and out of service(s) 110. Correlation analysis module 120 may capture and report real-time telemetry of workloads processed by native services and containerized services in a hybrid and multi-cloud environment. In one or more embodiments, domain context labeling 118 is configured to label domain context for each event. Scaling module 124 is configured to scale up and down services 110. Scaling module 124 may classify the network traffic into and out of the service gateway and may correlate the network traffic to service(s) 110. Scaling module 124 may scale up and down according to onboarded components that comprise the differentiated workload. In one or more embodiments, global event handler 122 is configured to be resident on the cloud to capture and process these events and send the events to a data analyzer service. Global event handler 122 may perform cross-correlation in real-time of telemetry data and may update a real-time differentiated workload report. Global event handler 122 may capture generated events for data analysis. Global event handler 122 may promote a real-time autocorrelation, analysis, and reporting capability. Global event handler 122 may be internal to the cloud and may inherit a fine-grained data security infrastructure offered by each cloud service 110.

Figure 2:
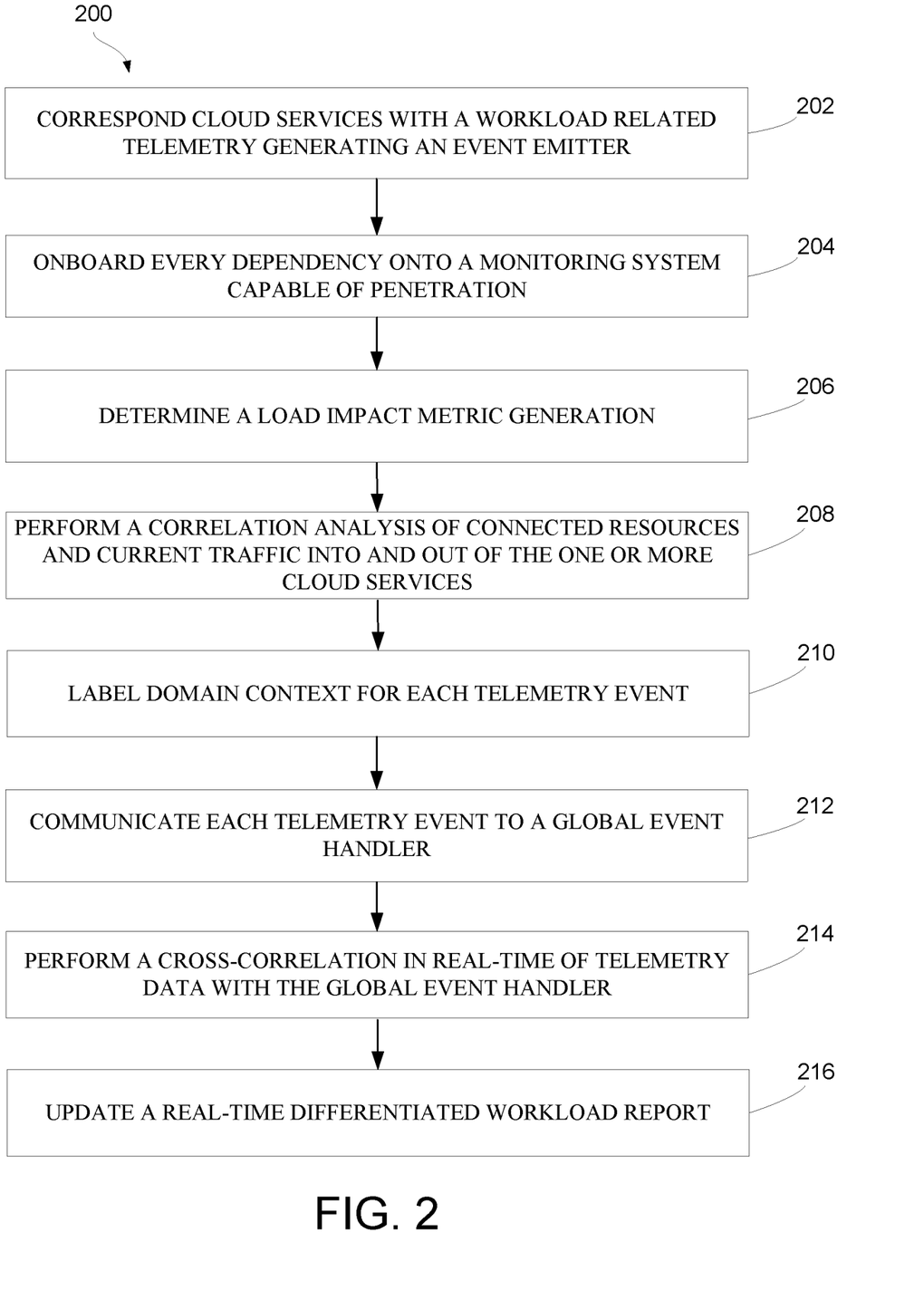
FIG. 2 is a flowchart depicting operational steps of a workload telemetry module within a computing device of FIG. 1, in accordance with an embodiment of the present disclosure.

FIG. 2 is a flowchart 200 depicting operational steps of workload telemetry module 112 in accordance with an embodiment of the present disclosure.

Workload telemetry module 112 operates to correspond one or more cloud services 110 with a workload related telemetry generating an event emitter. Workload telemetry module 112 also operates to onboard every dependency onto a monitoring system capable of penetration. Workload telemetry module 112 operates to determine a load impact metric generation. Workload telemetry module 112 operates to perform a correlation analysis of connected resources and current traffic into and out of the one or more cloud services 110. Workload telemetry module 112 operates to label domain context for each telemetry event. Workload telemetry module 112 operates to communicate each telemetry event to global event handler 122. Workload telemetry module 112 operates to perform a cross-correlation in real-time of telemetry data and updating a real-time differentiated workload report with global event handler 122.

In step 202, workload telemetry module 112 corresponds one or more cloud services 110 with a workload related telemetry generating an event emitter (e.g., usage, complexity, timestamp, container, pod, server, host, database). Workload telemetry module 112 may monitor connected resources and current traffic into and out of service(s) 110. Telemetry may refer to monitoring and analyzing information about cloud service(s) 110 to track performance and identify issues. Telemetry may be an automated communication process from multiple data sources. An event emitter may be a pattern that listens to a named event. An event emitter may fire a callback. An event emitter may emit the event with a value. With an event emitter, workload telemetry module 112 may raise a new event from a different part of an application. Workload telemetry module 112 may listen to the raised event. Workload telemetry module 112 may have an action performed for the event. Workload telemetry module 112 may collect logs and execution metrics related to applications and infrastructure on disparate systems in a hybrid and multi-cloud environment. Workload telemetry module 112 may collect the logs and execution metrics in a real-time telemetry of cloud resources running in a hybrid and multi-cloud environment. Workload telemetry module 112 may provide workload onboarding and may initiate accurate usage metering to create realistic and dynamic licensing terms for the workload. Workload telemetry module 112 may dynamically assess workload conditions and usage characteristics with the real-time telemetry of onboarded workloads. For example, workload telemetry module 112 may assess workload conditions and usage characteristics, e.g., who has initiated the workload, when the workload is initiated, what the planned workload execution is, what the actual workload execution is, when the workload stops. In an example, workload telemetry module 112 may onboard a workflow, whereby the telemetry events are assigned, initiated and provided to global event handler 122. Workload telemetry module 112 may offboard the workload. Workload telemetry module 112 may automatically provide an exit report including utilization, cleanup, security and other useful workload statistics. Workload telemetry module 112 may establish a real-time metering capability that allows an accurate licensing of workload computing usage in a hybrid and multi-cloud environment. Workload telemetry module 112 may provide a responsive and dynamic licensing model based on actual usage and available computing resources.

In step 204, workload telemetry module 112 onboards every dependency onto a monitoring system capable of penetration. Workload telemetry module 112 may monitor connected resources. In step 206, workload telemetry module 112 determines a load impact metric generation. For example, workload telemetry module 112 may determine a metric that identifies a rate at which an application reads a disk. Workload telemetry module 112 may determine a metric that identifies a rate at which an application writes to a hard disk. Workload telemetry module 112 may determine a metric that is used to determine the volume of the data the application reads from the hard disk of the instance. Workload telemetry module 112 may determine a metric that is used to determine the volume of the data the application writes onto the hard disk of the instance. Workload telemetry module 112 may determine a metric that identifies the volume of incoming network traffic to an application on a single instance. Workload telemetry module 112 may determine a metric that identifies the volume of outgoing network traffic to an application on a single instance. Workload telemetry module 112 may determine a metric that collects and sends the memory utilization excluding cache memory and buffers. Workload telemetry module 112 may determine a metric that collects and sends available memory used by the operating system and the application. Workload telemetry module 112 may determine the amount of swap space utilized.

In step 208, workload telemetry module 112 performs a correlation analysis of the corresponding relationship and connection among connected resources and current traffic into and out of service(s) 110. In step 210, workload telemetry module 112 labels domain context for each event. Workload telemetry module 112 may capture and report real-time telemetry of workloads processed by native services and containerized services in a hybrid and multi-cloud environment. The hybrid and multi-cloud environment may be a hyper-scale environment whereby the network traffic into and out of the service gateway can be classified immediately and auto correlated to the processing service(s) or container(s).

In step 212, workload telemetry module 112 communicates a telemetry event to global event handler 122. Global event handler 122 may be resident on the cloud to capture and process telemetry events and send the events to a data analyzer service. In step 214, workload telemetry module 112 performs, using global event handler 122, a cross-correlation in real-time of telemetry data. In step 216, workload telemetry module 112 updates a real-time differentiated workload report.

Figure 3:
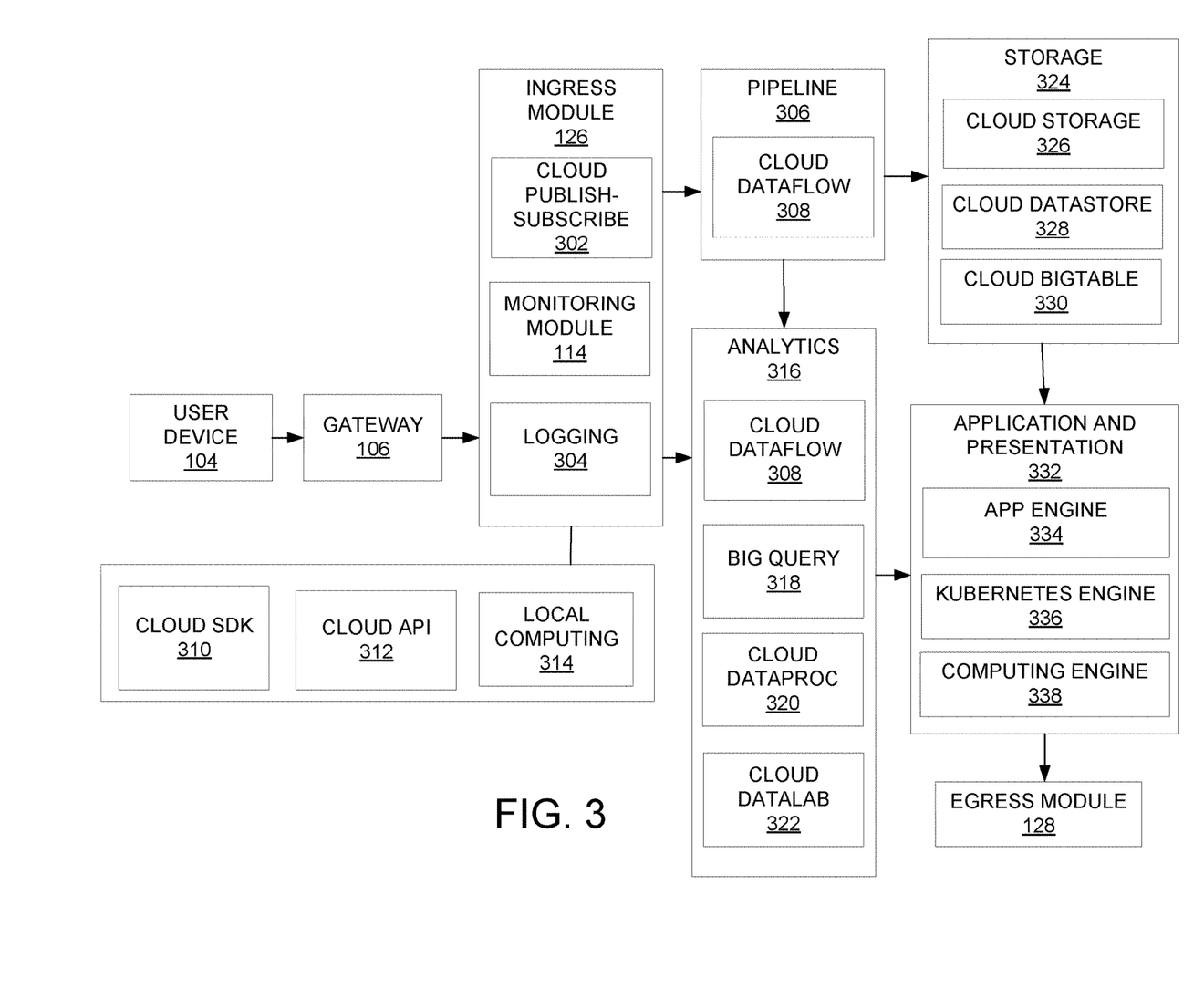
FIG. 3 illustrates an exemplary functional diagram of the workload telemetry module within the computing device of FIG. 1, in accordance with an embodiment of the present disclosure.

FIG. 3 illustrates an exemplary functional diagram of workload telemetry module 112, in accordance with an embodiment of the present disclosure.

In the example of FIG. 3, user device 104 can be a constrained device to be allowed to access and use service(s) 110 in a cloud environment. For example, user device 104 can be a licensed device to access and use service(s) 110. Gateway 106 can be a hardware or software appliance that serves as a bridge between local applications and remote cloud-based services 110. Gateway 106 may provide basic protocol translation and simple connectivity to allow incompatible technologies to communicate. Workload telemetry module 112 may correspond each custom cloud service 110 with a workload related telemetry generating an event emitter (e.g., usage, complexity, timestamp, container, pod, server, host, database). Workload telemetry module 112 may monitor connected resources and current traffic into and out of service(s) 110, e.g., cloud publish-subscribe 302, pipeline 306, analytics 316, storage 324, application and presentation 332, and local computing 314. Workload telemetry module 112 may dynamically assess workload conditions and usage characteristics with the real-time telemetry of onboarded workloads. Local computing 314 may be communicated with ingress module 126, cloud SDK (software development kit) 310, and cloud API (application programming interface) 312. Ingress module 126 may include cloud publish-subscribe 302, monitoring module 114, and logging 304. Ingress module 126 may onboard every dependency onto a monitoring system capable of penetration. Ingress module 126 may be a facility that provides the workload onboarding and initiates accurate usage metering to create realistic and dynamic licensing terms for the workload. Monitoring module 114 may monitor connected resources and current traffic into and out of service(s) 110. Logging 304 may collect the logs and execution metrics in a real-time telemetry of cloud resources running in a hybrid and multi-cloud environment. Pipeline 306 may include cloud dataflow 308. Analytics 316 may include, for example, cloud dataflow 308, big query 318, cloud dataproc 320, and cloud datalab 322. Storage 324 may include, for example, cloud storage 326, cloud datastore 328, and cloud bigtable 330. Application and presentation 332 may include, for example, app engine 334, Kubernetes engine 336, and computing engine 338. Egress module 126 may offboard the workload and may automatically provide an exit report including utilization, cleanup, security and other useful workload statistics.

Figure 4:
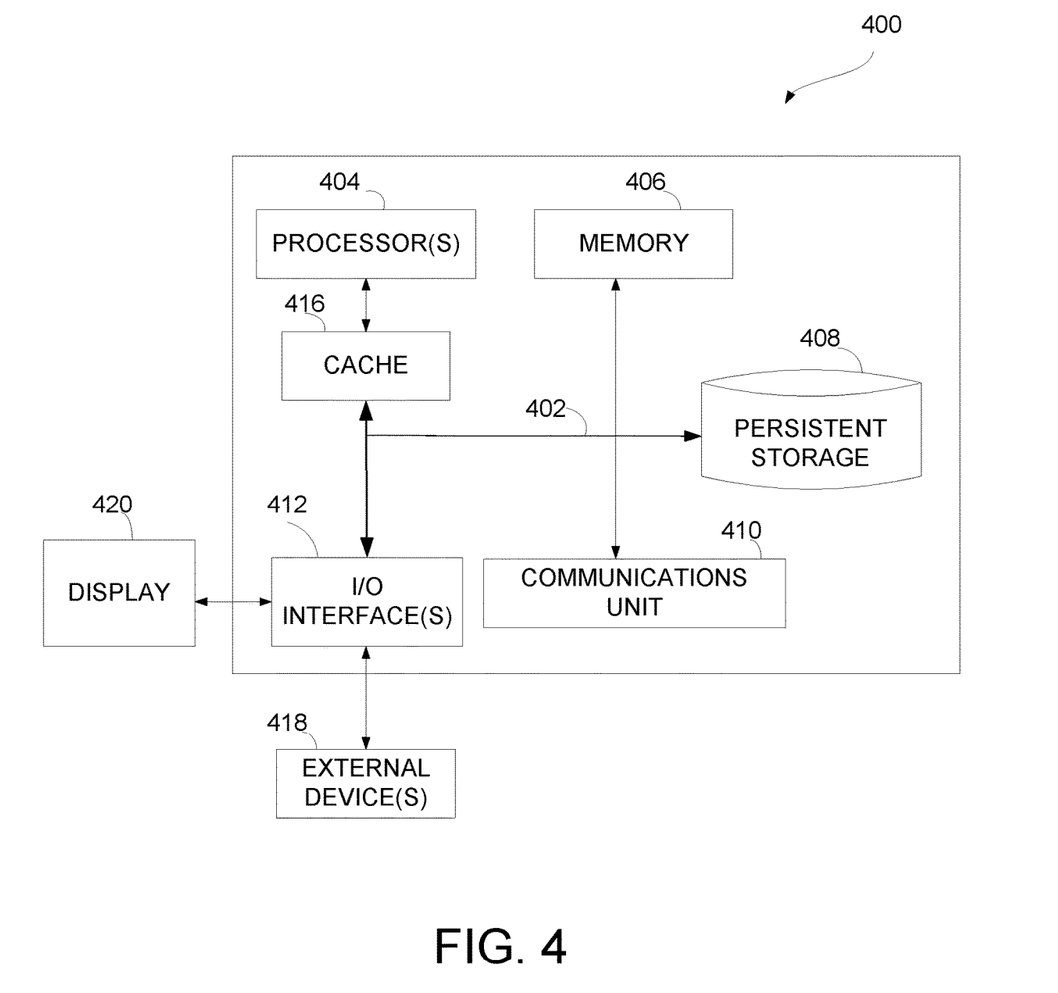
FIG. 4 is a block diagram of components of the computing device of FIG. 1, in accordance with an embodiment of the present disclosure.

FIG. 4 depicts a block diagram 400 of components of computing device 102 in accordance with an illustrative embodiment of the present disclosure. It should be appreciated that FIG. 4 provides only an illustration of one implementation and does not imply any limitations with regard to the environments in which different embodiments may be implemented. Many modifications to the depicted environment may be made.

Computing device 102 may include communications fabric 402, which provides communications between cache 416, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Workload telemetry module 112 may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Workload telemetry module 112 may be downloaded to persistent storage 408 through communications unit 410.

I/O interface(s) 412 allows for input and output of data with other devices that may be connected to computing device 102. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., workload telemetry module 112 can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
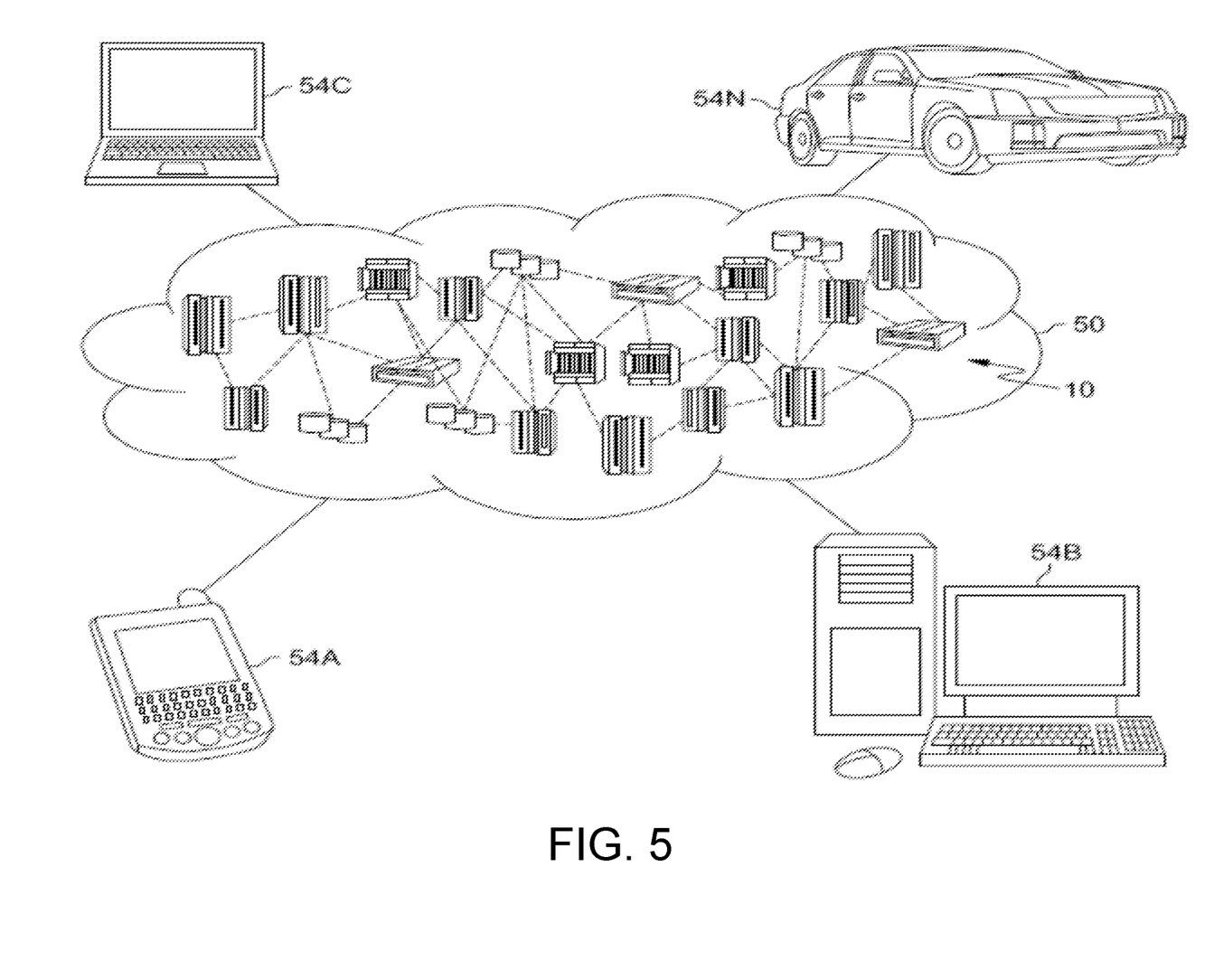
FIG. 5 depicts an embodiment of a cloud computing environment in accordance with the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
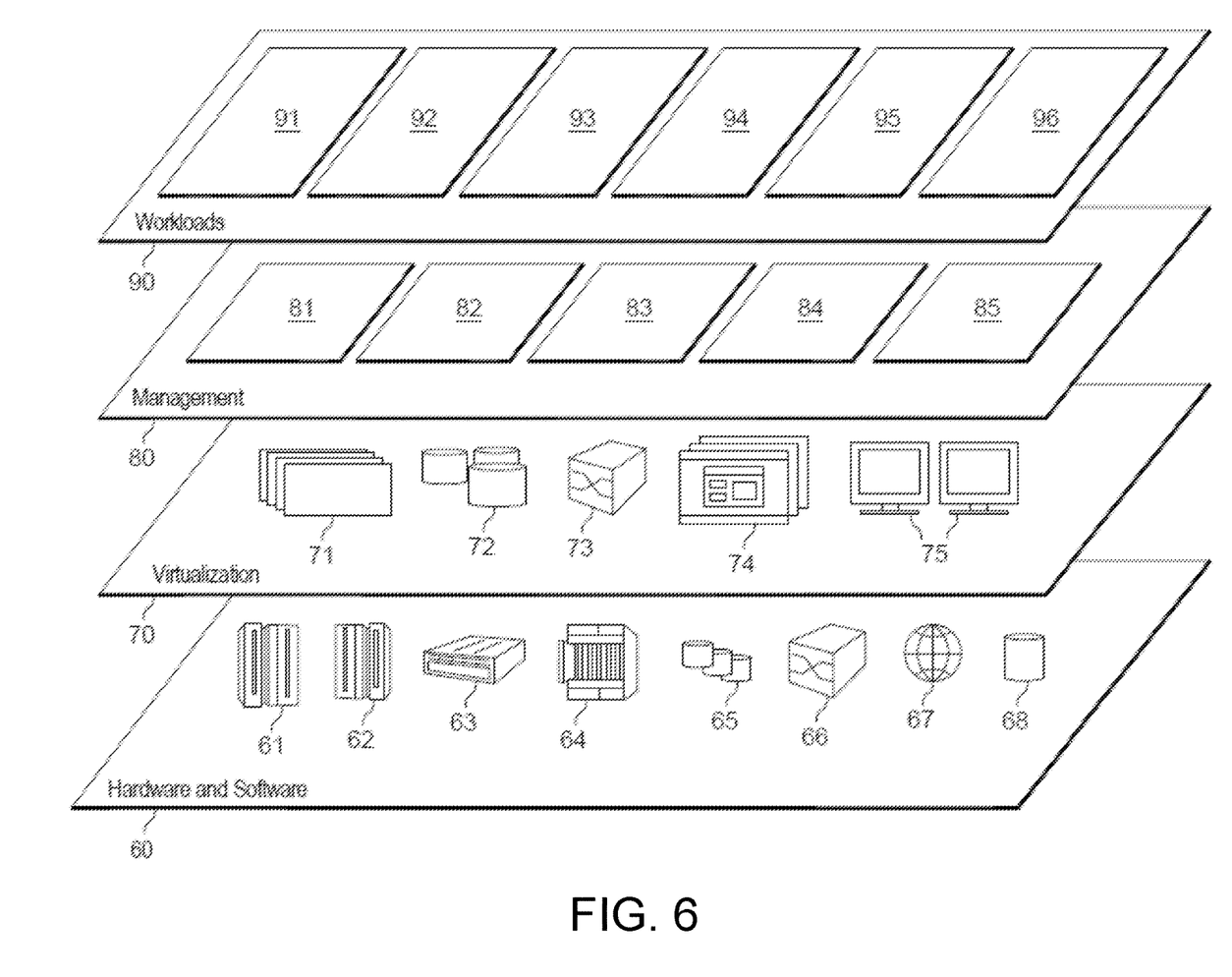
FIG. 6 depicts an embodiment of abstraction model layers of a cloud computing environment, in accordance with the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and module 96 including, for example, workload telemetry module 112 as described above with respect to differentiated workload telemetry environment 100.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
   corresponding, by one or more processors, one or more services with one or more workload-related telemetry events to generate an event emitter;
   performing, by one or more processors, a correlation analysis of corresponding relationship and connection among connected resources and current traffic into and out of the one or more services;
   labeling, by one or more processors, domain context for each telemetry event from among the one or more workload-related telemetry events;
   communicating, by one or more processors, each telemetry event from among the one or more workload-related telemetry events to a global event handler;
   performing, by one or more processors, a real-time cross-correlation of telemetry data associated with the one or more workload-related telemetry events with the global event handler;
   updating, by one or more processors, a real-time differentiated workload report;
   onboarding, by one or more processors, every dependency from among a plurality of dependencies onto a monitoring system capable of penetration; and
   determining, by one or more processors, a load impact metric generation.

2. The computer-implemented method of claim 1, wherein determining the load impact metric generation comprises:
   determining a metric that identifies a rate at which an application reads a disk;
   determining a metric that identifies a rate at which an application writes to a hard disk;
   determining a metric that is used to determine the volume of the data the application reads from the hard disk of the instance;
   determining a metric that is used to determine the volume of the data the application writes onto the hard disk of the instance;
   determining a metric that identifies the volume of incoming network traffic to an application on a single instance;
   determining a metric that identifies the volume of outgoing network traffic to an application on a single instance;
   determining a metric that collects and sends the memory utilization excluding cache memory and buffers;
   determining a metric that collects and sends available memory used by the operating system and the application; and
   determining an amount of swap space utilized.

3. The computer-implemented method of claim 1, further comprising:
   monitoring and collecting logs and execution metrics in a real-time telemetry of cloud resources running in a hybrid and multi-cloud environment; and
   scaling up and down the one of more cloud services according to onboarded components that comprise a workload.

4. The computer-implemented method of claim 1, further comprising:
   onboarding a workload;
   initiating accurate usage metering to create dynamic licensing terms for the workload;
   offboarding the workload; and
   providing an exit report including utilization, cleanup, and security.

5. The computer-implemented method of claim 1, wherein the global event handler is resident on a cloud to capture and process the one or more workload-related telemetry events and send the events to a data analyzer service.

6. The computer-implemented method of claim 1, wherein the event emitter generated for telemetry is selected from the group consisting of: usage, complexity, timestamp, container, pod, server, host, and database.

7. A computer program product comprising:
   one or more computer readable storage media, and program instructions collectively stored on the one or more computer readable storage media, the program instructions comprising:
   program instructions to correspond one or more services with one or more workload-related telemetry events to generate an event emitter;

program instructions to perform a correlation analysis of corresponding relationship and connection among connected resources and current traffic into and out of the one or more services;

program instructions to label domain context for each telemetry event from among the one or more workload-related telemetry events;

program instructions to communicate each telemetry event from among the one or more workload-related telemetry events to a global event handler;

program instructions to perform a real-time cross-correlation of telemetry data associated with the one or more workload-related telemetry events with the global event handler;

program instructions to update a real-time differentiated workload report;

program instructions to onboard every dependency from among a plurality of dependencies onto a monitoring system capable of penetration; and program instructions to determine a load impact metric generation.

8. The computer program product of claim 7, wherein program instructions to determine the load impact metric generation comprise:

program instructions to determine a metric that identifies a rate at which an application reads a disk;

program instructions to determine a metric that identifies a rate at which an application writes to a hard disk;

program instructions to determine a metric that is used to determine the volume of the data the application reads from the hard disk of the instance;

program instructions to determine a metric that is used to determine the volume of the data the application writes onto the hard disk of the instance;

program instructions to determine a metric that identifies the volume of incoming network traffic to an application on a single instance;

program instructions to determine a metric that identifies the volume of outgoing network traffic to an application on a single instance;

program instructions to determine a metric that collects and sends the memory utilization excluding cache memory and buffers;

program instructions to determine a metric that collects and sends available memory used by the operating system and the application; and program instructions to determine an amount of swap space utilized.

9. The computer program product of claim 7, further comprising:

program instructions to monitor and collect logs and execution metrics in a real-time telemetry of cloud resources running in a hybrid and multi-cloud environment; and program instructions to scale up and down the one of more cloud services according to onboarded components that comprise a workload.

10. The computer program product of claim 7, further comprising:

program instructions to onboard a workload;

program instructions to initiate accurate usage metering to create dynamic licensing terms for the workload;

program instructions to offboard the workload; and program instructions to provide an exit report including utilization, cleanup, and security.

11. The computer program product of claim 7, wherein the global event handler is resident on a cloud to capture and process the one or more workload-related telemetry events and send the events to a data analyzer service.

12. The computer program product of claim 7, wherein the event emitter generated for telemetry is selected from the group consisting of: usage, complexity, timestamp, container, pod, server, host, and database.

13. A computer system comprising:

one or more computer processors, one or more computer readable storage media, and program instructions stored on the one or more computer readable storage media for execution by at least one of the one or more computer processors, the program instructions comprising:

program instructions to correspond one or more services with a one or more workload-related telemetry events to generate an event emitter;

program instructions to perform a correlation analysis of corresponding relationship and connection among connected resources and current traffic into and out of the one or more services;

program instructions to label domain context for each telemetry event from among the one or more workload-related telemetry events;

program instructions to communicate each telemetry event from among the one or more workload-related telemetry events to a global event handler;

program instructions to perform a real-time cross-correlation of telemetry data associated with the one or more workload-related telemetry events with the global event handler;

program instructions to update a real-time differentiated workload report;

program instructions to onboard every dependency from among a plurality of dependencies onto a monitoring system capable of penetration; and program instructions to determine a load impact metric generation.

14. The computer system of claim 13, wherein program instructions to determine the load impact metric generation comprise:

program instructions to determine a metric that identifies a rate at which an application reads a disk;

program instructions to determine a metric that identifies a rate at which an application writes to a hard disk;

program instructions to determine a metric that is used to determine the volume of the data the application reads from the hard disk of the instance;

program instructions to determine a metric that is used to determine the volume of the data the application writes onto the hard disk of the instance;

program instructions to determine a metric that identifies the volume of incoming network traffic to an application on a single instance;

program instructions to determine a metric that identifies the volume of outgoing network traffic to an application on a single instance;

program instructions to determine a metric that collects and sends the memory utilization excluding cache memory and buffers;

program instructions to determine a metric that collects and sends available memory used by the operating system and the application; and program instructions to determine an amount of swap space utilized.

15. The computer system of claim 13, further comprising:
program instructions to monitor and collect logs and execution metrics in a real-time telemetry of cloud resources running in a hybrid and multi-cloud environment; and
program instructions to scale up and down the one of more cloud services according to onboarded components that comprise a workload.

16. The computer system of claim 13, further comprising:
program instructions to onboard a workload;
program instructions to initiate accurate usage metering to create dynamic licensing terms for the workload;
program instructions to offboard the workload; and
program instructions to provide an exit report including utilization, cleanup, and security.

17. The computer system of claim 13, wherein the global event handler is resident on a cloud to capture and process the one or more workload-related telemetry events and send the events to a data analyzer service.

\* \* \* \* \*